Patented June 1, 1948

2,442,533

UNITED STATES PATENT OFFICE 2,442,533

TREATMENT OF GLYCERIDES

Eddy W. Eckey, Wyoming, Ohio, assignor to The Procter & Gamble Company, Cincinnati, Ohio, a corporation of Ohio No Drawing. Application November 30, 1945, Serial No. 632,117

16 Claims. (Cl. 260—410.7)

This invention relates to an improved method of treating triglycerides constituted of combined unsaturated fatty acids in predominant proportion whereby unsaturated constituents may be separated. A specific embodiment of the invention contemplates the treatment of marine animal oils and the production of glyceride fractions therefrom which are suitable for use in the paint and soap industries respectively.

This application is a continuation-in-part of application Serial No. 547,315, filed July 29, 1944.

In my copending application Serial No. 562,062, filed November 6, 1944 for "Process for treating fats and fatty oils," I have disclosed how interesterification (a term synonymous with "molecular rearrangement" as used therein) of fats constituted of combined fatty acids whose molecular structures differ in respects affecting solubility of glycerides thereof in the glyceride system may be brought about by treatment of the fats with a suitable low temperature interesterification catalyst at a temperature sufficiently low that insoluble glycerides as they are formed crystallize out from the reaction mixture thereby inducing a continuation of the interesterification reaction to such an extent that the physical properties of a batch of fat are changed and may be controlled to produce products within a desired range of properties such as melting point and solidifying point.

As explained more fully in the aforesaid copending application Serial No. 562,062, my process differs radically from the ordinary molecular interchange reactions which are conducted wholly in the liquid phase. In the latter process which involves heating a natural glyceride or mixture of glycerides to a temperature substantially above the melting point, an interchange or rearrangement of fatty acid radicals occurs. Since this interchange of radicals is reversible, the constitution of the glyceride fat molecules after continuance of such a reaction at high temperature for some time is in accordance with the operation of the law of probabilities, and the final result can be predicted from a knowledge of the nature of the fatty acids constituting the fat or mixture of fats.

The invention of my aforementioned earlier application Serial No. 562,062, as briefly indicated above, is based on the discovery that under the proper conditions of treatment rearrangement of fatty acid radicals may be directed and controlled to achieve results not heretofore obtained. In this connection I have found that if the fat, at least a part of which is liquid, is mixed with a suitable catalyst and molecular rearrangement (interesterification) is permitted to take place at a temperature below that at which the liquid phase is saturated with respect to relatively high melting triglyceride fats, such high melting triglycerides formed in the course of interchange of fatty acid radicals will crystallize from the liquid fat and take no further part in the interchange process. Thus as molecules having low solubility in the liquid fat phase are formed and crystallize out of solution, further rearrangement of such molecules (such as would occur in the conventional single phase reaction) is prevented; consequently the percentage of higher melting molecules present in the whole fat mixture tends to increase as long as crystallization continues. Crystallization of such relatively insoluble solid triglycerides can continue as long as the solubility thereof in the liquid fat phase at the temperature of reaction is exceeded by the amount newly formed in the reaction.

Completely saturated triglycerides are least soluble in the liquid constituents and therefore, unless special precautions or modifications of conducting the process, such as preferential seeding and the use of special temperature control to induce the crystallization of a particular type of glyceride are taken, practice of the process on the average triglyceride will result to a large extent in the crystallization of completely saturated triglycerides, and accordingly in the conversion of a large proportion of mixed saturated-unsaturated triglycerides into completely saturated triglycerides and completely unsaturated triglycerides.

In the present application which relates to the general subject matter of the aforementioned application Serial No. 562,062, it is my object to explain a specific development within the broad field of molecular rearrangement of triglycerides. Said development includes the separation of triglycerides into solid and liquid fractions, and especially involves the production of triglyceride oils suitable for use in the paint industry, such as drying oils.

It is my object to explain how an improved separation of the solid and liquid constituents of triglycerides may be effected, how the range of fats and fatty oils utilizable in the paint industry may be increased, how the properties of marine animal oils for use in the paint industry may be improved, and how, coincident with such improvements, an oil better suited for use in the soap industry may be obtained by the application of controlled molecular rearrangement.

The following description of the invention is directed primarily to its specific application to marine animal oils whereby liquid and solid glyceride fractions of improved characteristics may be obtained. However the invention may also be applied to other triglycerides, especially those which are constituted of combined unsaturated fatty acids in predominant proportions.

Marine animal oils, especially menhaden, salmon, sardine, and pilchard oils, have found some use in industries that employ drying oils. These and other marine animal oils have also been hydrogenated and used in the manufacture of soap. In both industrial fields the oils have serious disadvantages as compared with other materials employed, and therefore it has been necessary to sell the marine animal oils at a substantially lower price than many of the competing oils.

In the drying oil industries, for example, the disadvantages of the marine animal oils stem from their high content of saturated fatty acids which are detrimental to the drying properties of the oils (see "Chemistry and Technology of Marine Animal Oils," Fisheries' Research Board of Canada, Bulletin 59, 1941, pp. 322–323, 329–338). Cold-clearing (winterizing) has been used in an attempt to remove the high melting, saturated constituents of the oils and thereby improve same for use as a drying oil (ibid. pp. 260–270), but winterizing even at very low temperatures does not reduce the per cent combined saturated fatty acid appreciably because these saturated acids are combined mainly in mixed triglyceride molecules containing unsaturated fatty acids also.

The presence of these saturated constituents is known to be detrimental in other respects. When the original or winterized oils are polymerized to make a bodied oil, for example, the glycerides containing combined saturated fatty acids are rendered less soluble and may precipitate as a cloud sometimes referred to as "polymer cloud." Since the solubility of the constituents containing saturated fatty acids decreases with increase in polymerization, the permissible degree of polymerization is limited by the proportions of saturated constituents in the oil (ibid. pp. 127–129).

The use of the marine animal oils in the soap industry is limited because of the combined content of unsaturated fatty acids containing 20 to 24 carbon atoms. These fatty materials readily oxidize, and if not stabilized by some process such as hydrogenation they form soaps which are highly susceptible to oxidation and the development of rancidity. If the fatty materials are hydrogenated to reduce this susceptibility to oxidation, then the saturated compounds formed containing 20 to 24 carbon atoms and corresponding to the unsaturated materials produce soaps of only limited solubility and mediocre performance in detergent operations.

According to the present invention the oil is first subjected to controlled molecular rearrangement, whereby it is converted from a glyceride mixture composed mainly of mixed saturated-unsaturated triglycerides to one composed mainly of saturated triglycerides and unsaturated triglycerides, and then the rearranged oil is fractionated. In contrast to the results obtained in winterizing the original oil, the rearranged oil can be separated easily into fractions widely different in iodine number and titer, either by winterizing (fractional crystallization) followed by simple filtration, or by crystallizing from solvent and filtering, or by liquid-liquid separation with a partially miscible solvent such as furfural. Analyses on such fractions show clearly a conversion of mixed saturated-unsaturated glycerides into saturated triglycerides and unsaturated triglycerides.

In thus concentrating the unsaturated acids in unsaturated triglycerides and saturated acids (consisting mainly of palmitic and myristic acids) in saturated triglycerides, it is easily possible to separate the rearranged material into a liquid fraction having a relatively high degree of unsaturation and markedly improved drying properties, and a solid fraction having markedly improved properties for use in the manufacture of soap.

The manner in which the invention may be practiced is shown in the following examples and accompanying details but it is to be understood that this exemplary matter is given by way of description only and is not to be considered as limiting the scope of the invention covered by the appended claims.

*Example 1.*—600 parts of refined, bleached and deodorized menhaden oil were introduced into a container equipped with a motor driven agitator. To the charge was added 0.3% of sodium methoxide in the form of a suspension in xylene prepared by the gradual addition during vigorous agitation of anhydrous methanol to an equivalent quantity of finely divided sodium in xylene. The mixture of oil and sodium methoxide catalyst was agitated for 30 minutes at 120° F.

This oil-catalyst mixture was then placed in a room at 40° F. for 2 hours; then stored for 2 days in a room at 70° F., then 3 days at 60° F., and then 5 days at 50° F.

Thereafter the rearranged oil at about 50° F. was treated with dilute phosphoric acid to destroy the catalyst. The product was melted, washed, and subsequently dried.

The rearrangement conducted in the above manner produced a radical change in the glyceride structure of the menhaden oil, as was evidenced by a change in the cloud point from 3.4° C. to 28.7° C. and by the fact that fractional crystallization of a sample of the rearranged oil from a solution in 10 volumes of petroleum ether at 32° F. yielded 16.9% (based on the rearranged oil dissolved) of solid glycerides having an iodine number of about 4.5 and that fractional crystallization of the original oil from petroleum ether under the same conditions yielded less than 1% of solid glycerides. Such changes in characteristics of the oil show that a large proportion of the saturated fatty acids combined in the oil were converted from a mixed saturated-unsaturated triglyceride to a substantially completely saturated triglyceride.

The melted, washed, and dried rearranged oil was then allowed to crystallize for 2 days at 90° F., the crystallized portion being separated from the mother liquor by filtration. The liquid fraction resulting from this separation was recrystallized at 70° F. for 6 hours and at 60° F. overnight. The solid and liquid fractions resulting were separated by suction filtration. The following data on the various fractions were obtained.

|  | Liquid Fractions | | Solid Fractions | |
|---|---|---|---|---|
|  | Iodine Number | Yield Per Cent of Original Menhaden Oil | Iodine Number | Yield Per Cent of Original Menhaden Oil |
| (1) Menhaden oil | 188 |  |  |  |
| (2) Rearranged menhaden oil grained and filtered at 90° F | 216 | 51 | 154 | 49 |
| (3) Liquid fraction from (2) regrained and filtered at 60° F | 226 | 42 | 170 | 9 |

The liquid fraction having the 226 iodine number was a good drying oil and under comparable tests dried to a clear, dry film, whereas the original oil produced a sticky, turbid film.

The combined solid fractions, having an iodine number of about 156 may be hydrogenated to about 60 iodine number and converted into a soap having better stability and giving better performance in washing than the original oil hydrogenated to the same iodine number.

*Example 2.*—Refined and dried menhaden oil having an iodine number of 172 was mixed thoroughly at 120° F. with 0.2% of sodium methoxide in the form of a finely divided suspension in xylene (1 ml. of suspension contained 0.1 gram sodium methoxide). Air was excluded during the mixing operation. The oil-catalyst mixture was transferred to a tightly closed cylindrical container which was then rotated at about 4 R. P. M. in a horizontal position for 2 days in a constant temperature room at 70° F. The simultaneous crystallization and rearrangement which took place transformed the oil into a thick slurry of crystals in liquid oil.

The catalyst was then inactivated by treatment of the mixture with dilute acid. Thereafter a portion of the product was dissolved in 10 volumes of commercial pentane and the solution was cooled to 20° F. and held overnight at that temperature to effect fractional crystalliaztion. Filtration of the mixture and removal of solvent yielded 16.2% (based on the rearranged oil dissolved) of a crystallized fraction with an iodine number of about 5, and 83.8% of a liquid fraction with a calculated iodine number of 204. The original menhaden oil precipitated less than 1% of low iodine number solid fraction when dissolved in 10 volumes of commercial pentane and treated in the same way.

Another portion of the rearranged oil was dissolved in twice its weight of warm furfural and held at 100° F. until a separation into two layers was complete. A control sample of the original oil was treated in the same way. Separation of the layers and removal of the furfural yielded the following fractions:

|  | Oil from the Furfural Rich Phase | | Oil from the Fat Rich Phase |
|---|---|---|---|
|  | Per Cent Yield | Iodine No. | Iodine No. |
| From rearranged menhaden oil | 25.2 | 211.3 | 156.9 |
| From original oil | 25.5 | 199.4 | 163.1 |

The 211.3 iodine number fraction from the rearranged oil was superior in drying properties to either the original oil or to the 199.4 iodine number fraction obtained therefrom by furfural extraction.

Multiple or continuous extraction may be employed if desired.

*Example 3.*—Refined, filtered and dried menhaden oil having an iodine number of 177.5 was mixed at 120° F. for about ½ hour in the absence of air, with 0.2% of finely divided sodium methoxide catalyst suspended in xylene. The mixture was cooled quickly to 85° F., and 1% of a slurry of solid triglycerides in liquid oil obtained by the molecular rearrangement of cottonseed oil at 70° F. was added and mechanically agitated therein in order to seed the mixture for crystallization. This mixture was then charged to a cylindrical container, the air in the unoccupied space being replaced with purified nitrogen. The container was then closed and rotated slowly in a horizontal position for 20 hours at 80° F., 26 hours at 70° F., and about 100 hours at 60° F. At the end of the molecular rearrangement period, the contents of the container were transferred to a Buchner funnel and the crystallized portion separated from the liquid portion by suction filtration. Thereafter the catalyst was inactivated in each fraction. The liquid fraction amounted to about 40% of the original oil and had an iodine number of about 225. The solid fraction had an iodine number of about 135. This represents a much more complete separation of the saturated and unsaturated portions of the oil than could be obtained merely by subjecting the original oil to crystallization at 60° F. and separation by filtration.

The liquid fraction of the rearranged oil dried to a clear hard film and was suitable for use as a drying oil in paints. The solid fraction contained an appreciable quantity of saturated triglycerides of myristic and palmitic acids and was more suitable for use in soap manufacture than either the original oil or a solid fraction obtained directly from the original oil under comparable crystallization conditions.

*Example 4.*—To refined, filtered and dried sardine oil having an iodine number of 179.0 was added 0.3% of sodium tertiary butoxide as a finely divided suspension in xylene. After seeding with about 1% of a slurry of solid and liquid triglycerides obtained from cottonseed oil rearranged at 70° F., the mixture was rearranged for one day at 80° F., one day at 70° F., and 3 days at 60° F. Thereafter a slightly greater than theoretical amount of anhydrous acetic acid was added to the rearranged mixture to inactivate the catalyst. The mixture was then pumped through a filter press and separated into approximately equal fractions of solid and liquid having iodine numbers of 130.2 and 225.4 respectively. Some of the solid fraction was dissolved in 10 volumes of petroleum ether and held at 20° F. overnight. Under this treatment solid triglycerides amounting to 43.2% of the dissolved fraction and having an iodine number of about 5 crystallized and were separated. From the thus indicated trisaturated glyceride content of the original solid fraction, a trisaturated glyceride content of 21.5% for the entire rearranged product is calculated. Since the original sardine oil contained about 22% combined saturated acids, it will be apparent that practically all of the saturated acids were concentrated in the solid fraction separated from the rearranged oil.

It is well known in the drying oil industry that it is most difficult to obtain from marine animal oils bodied oils which do not form "polymer clouds." Even well winterized marine animal oil cannot be bodied higher than an absolute viscosity of about 9 poises without encountering this difficulty. This "cloud" formation increases with increase in viscosity of the heat-bodied material and as discussed above is attributed to the decrease in solubility of the saturated or partly saturated glycerides as the viscosity of the bodied marine animal oils increases.

It is also well known that the use of a marine animal drying oil in paints and varnishes results in a film that becomes yellow or brown on aging, tacky in humid weather and brittle if sufficient drier is added to effect complete drying. "Bodying" (a term used to indicate high temperature heat treatment usually above 250° C.) avoids to a great extent the above referred to disadvantages of these drying oils, but the films of the bodied oils may become turbid or cloudy in cold weather due to the "polymer cloud" and may clear up in warm weather. This alternate clouding and clearing gradually causes a breakdown of the film. As I shall show below, the use of the present invention results in an oil which may be bodied to a rather high degree to avoid yellowing, tackiness, etc., without the danger of "polymer cloud" formation. As demonstrated immediately below, the liquid fraction from the rearranged sardine oil of Example 4, for instance, appears to be freed from combined saturated fatty acids beyond the extent which can be reached by even drastic methods of winterizing.

Samples of the liquid fraction of the rearranged sardine oil of Example 4 were heat treated for various periods of time at 270° C. to yield products having absolute viscosities of 21.9, 48.1, and 74.3 poises. Even after weeks of standing at room temperature (70°–80° F.), these bodied samples of the liquid fraction remained perfectly clear.

The original sardine oil was winterized at 50° F. for 6 days. The separated liquid fraction was bodied at 270° C. for 11½ hours to give a product with an absolute viscosity of 21.7 poises.

Another sample of the original sardine oil was winterized at a final temperature of 40° F. The separated liquid fraction from this winterizing operation was bodied at 270° F. for 12¾ hours to give a product having an absolute viscosity of 34.1 poises.

A third sample of the original sardine oil was winterized at a final temperature of 32° F. The liquid fraction from this winterizing operation was bodied at 270° C. for 8½ hours to give a product with an absolute viscosity of 24.7 poises. Typical "polymer clouds" formed in all of these winterized and bodied samples when allowed to stand at room temperature.

Where the invention is used for the preparation of drying oils for the paint industry, it is of course preferable to apply the present process to oils containing unsaturated fatty acids which, as glycerides, dry to a clear, hard film. Three well known and readily available marine animal oils, menhaden, sardine, and pilchard oils, contain fatty acids having three or more double bonds and are particularly well adapted for use in this specific application of my invention. However, other marine animal oils which contain such unsaturated constituents in appreciable amount, as, for example, herring oil, salmon oil, etc., and oils having iodine numbers in excess of 130, may be employed.

The specific application of the invention to the preparation of oils for the drying oil industries from marine animal oils is only one of many possible applications. The invention may also be employed in the treatment of other oils containing combined unsaturated fatty acids in predominant proportion such as soybean, sunflower seed, cod liver, linseed, cottonseed and the like, whenever an efficient separation of combined saturated and unsaturated fatty acids into respective glyceride fractions is desired.

In the practice of my invention, the conditions of rearrangement and separation are preferably varied to compensate for the variations in oil composition. Thus it may be advisable to use different final temperatures for the molecular rearrangement reactions, depending on the oil and on the desired final product and the specific use designed for this product. If the final product is to be used as a drying oil, replacing linseed oil or other drying oil in whole or in part for example, then it is advisable to conduct the rearrangement under conditions such that a liquid fraction results having a combined saturated fatty acid content not substantially higher than 15 per cent, preferably less than 10 per cent, such as zero to 5 per cent for example. The degree of unsaturation of such liquid fractions will depend of course on the type of oil rearranged, but oils having iodine numbers above 180 and even as high as 210 to 230 may readily be produced. In accomplishing this end, it is advisable to finish the molecular rearrangement reaction at a temperature not higher than 60° F. Lower temperatures, of course, may be used but at the lower temperatures the rate of molecular rearrangement is relatively slow. Consequently it is advisable to choose conditions which will not only result in the production of a desired product, but which will be of practical interest insofar as commercial operation is concerned.

Since the temperatures at which the oils used in the practice of the present invention can begin to form solid crystals are below 110° F., in most cases below 100° F., the temperature at which the rearrangement is conducted in accordance with this invention for most practical applications is below such temperature but sufficiently high that a substantial proportion of the oil is liquid and sufficiently low to permit the crystallization from the liquid oil of solid triglycerides of low solubility formed in the rearrangement. In some applications of the invention it may be desirable to conduct the reaction at temperatures at which the oil appears to be solid but actually contains liquid oil entangled in the crystals of precipitated solid triglycerides. Even under such conditions rearrangement of the fatty acid radicals of the glycerides in the liquid phase will take place to form solid triglycerides of low solubility. Specifically the process has been successfully operated at final temperatures as low as 32° F., and even lower temperatures may be employed if desired.

I prefer to refer to the molecular rearrangement reaction used herein as being controlled molecular rearrangement because although there is no material change in the fatty acid composition of the oils during the shuffling of fatty acid radicals, there is a directed redistribution of these radicals brought about by the crystallizing step occurring simultaneously with rearrangement and consequently it is possible to change the molecular structure so that mixed saturated-unsaturated triglycerides are for the most part converted to saturated triglycerides on the one hand, and unsaturated triglycerides on the other. The advantages of such conversion and the manner in which it may be accomplished are described below.

In the practice of the present invention on natural triglyceride oils constituted of combined saturated and unsaturated fatty acids, I have found that sudden chilling or rapid reduction of the temperature during the rearrangement reaction favors the precipitation of triglycerides which contain an appreciable proportion of combined unsaturated fatty acid in their molecular structures. According to my experience the crystallized glycerides thus obtained are not readily and completely separable from the liquid oil phase by filtration or filter pressing for example; rather there is a tendency for the crystals to enmesh considerable liquid oil, thus necessitating a remelting of the rearranged oil (after inactivation of the catalyst) and a fractional crystallization processing with slow cooling and subsequent separation of the liquid and solid phases.

Moreover if the liquid fraction has a greater value than the solid fraction, then conducting the reaction so that appreciable quantities of the unsaturated fatty acids are chemically combined in the crystallized fraction is uneconomical because of the lower yield of liquid fraction.

I have found, however, that both of the above conditions are avoided if the rearrangement process is operated in accordance with a temperature schedule involving starting the reaction at the highest temperature at which completely saturated triglycerides can crystallize from the liquid triglycerides, and then gradually reducing the temperature so that the completely saturated triglycerides formed in the reaction are precipitated without substantial precipitation from solution of the disaturated-monounsaturated and monosaturated-diunsaturated glycerides.

The gradual reduction in temperature of the oil during the rearrangement reaction above referred to may be continuous, or stepwise as may be accomplished for example by transferring the batch of oil to chilling rooms held at successively lower temperatures. In either practice, the rate of cooling conducive to the precipitation of saturated triglycerides will be dependent on the type of oil being processed and its content and kind of combined saturated fatty acids. For an average oil such as menhaden oil or cottonseed oil a rate of $\frac{1}{2}°$ to $3°$ F. per hour has been found suitable. It should be borne in mind, however, that the rearrangement reaction rate at the lower temperatures is lower and that a rate of temperature reduction, which is suitable for precipitation of substantially completely saturated triglycerides at 60 to 70° F., may be too high at 40 to 50° F.

Although a gradual reduction in the temperature during the molecular rearrangement in accordance with the present invention is preferred for reasons above pointed out, the invention is not so limited and rapid cooling or sudden chilling may be used if desired, but, as pointed out above, separation of the liquid and solid fractions obtained by such practice is preferably conducted by first inactivating the catalyst under conditions which inhibit change in the rearrangement effected, and then subsequently subjecting the rearranged oil to fractional crystallization and separation under any suitable conditions whereby the completely unsaturated triglycerides are recovered.

It will be noted in Example 3 that the crystallization of the solid triglycerides is promoted by the addition of a slurry of solid glycerides (substantially completely saturated glycerides) dispersed in liquid glycerides obtained by molecular rearrangement of cottonseed oil at 70° F. Such a process is generally referred to in the art as "seeding" and I have found that it has a distinct beneficial effect when used in the present invention in conjunction with slow temperature reduction in promoting the formation of a crystal growth of saturated triglycerides which can be separated easily and efficiently from the mother liquor as soon as the rearrangement cycle has been completed. Although I have shown the use of a slurry obtained from cottonseed oil, it is obvious that slurry obtained in the low temperature molecular rearrangement of any other oil will serve the purpose provided it contains the desired type of crystals having a structure adapted for rapid and efficient filtration. Thus having obtained a crystalline structure which is suitable from the standpoint of separation of the solid glycerides from the mother liquor in the rearrangement of an oil, a slurry of this material may be used for seeding succeeding charges subjected to the rearrangement reaction.

I have found also that more efficient separation of the solid and liquid fractions results if the mixture is given gentle agitation during rearrangement. Agitation just sufficient to keep the precipitated solid material in suspension is preferred.

When the differences in solubility of the constituents of the glyceride system are small, as may be the case when the glycerides being rearranged are made up of unsaturated fatty acids differing in molecular weight or in degree of unsaturation, then it is more difficult to direct the reaction effectively, and in such a situation an inert fat solvent such as pentane, hexane, ethyl ether, benzene, Skellysolve, carbon tetrachloride, pyridine and the like which shows no significant activity toward either the glyceride or the catalyst, may be advantageously employed as a medium in which the reaction may be conducted. The use of such solvents permits the use of lower temperatures of rearrangement than otherwise could be used and magnifies differences on which efficient operation of the process depends. After rearrangement, the precipitated solid fraction may be suitably separated from the solution of the liquid fraction in the solvent before or after inactivation of the catalyst, or if desirable, the catalyst may be inactivated on completion of the rearrangement, the solid fraction redissolved in the solvent as by raising the temperature of the reaction mix, and the resulting solution subjected to fractional crystallization and separation.

In the examples I have shown the use of sodium methoxide and sodium tertiary butoxide as catalysts for the interesterification reaction, but effective practice of the invention does not depend upon the use of these particular compounds. Any material which will promote interesterification at the low temperatures required for crystallization of the solid glyceride fraction is suitable for use.

It is not unlikely that the true catalyst for the interesterification reaction is not the alkoxide or other compound added to the glyceride mixture but rather a compound resulting from the reaction of such added compound with the glyceride.

My experience has led me to the conclusion that the formation of active catalyst in the glyceride mixture can take place either by direct reaction of alkali metal with mono-, di- or triglycerides, or by the reaction of one or more of a great number of compounds which are capable of forming alkoxides by reaction with alcoholic substances. Such compounds will form alkoxides and will react with fats to form active catalyst when the material with which the metal or other cation is combined is not so acidic as to hold the cation in combination and prevent reaction with glyceride.

Thus, for example, potassium or sodium in combination with practically any material less acidic than phenol can form the catalyst when added to the glyceride. Sodium phenoxide appears to be on the borderline between what may be referred to in the present sense as active and inactive materials because only slight activity of this material in low temperature interesterification is noted when liberal quantities are added to the glyceride mixture. Compounds of sodium with materials more acidic than phenol (with fatty acids for example in the form of soap) will not react with the fat to form an active catalyst at the temperatures required in the practice of this invention.

In the above example I have chosen to illustrate my process principally with the use of an alkoxide compound such as sodium methoxide. This specific compound is a practical material for use in promoting the rearrangement in accordance with my invention because of the ready occurrence of the raw materials and its ease of preparation, and therefore the major portion of my work on rearrangement processes involving application of the principles set forth herein has included the use of sodium methoxide. The methoxides of other alkali metals such as lithium, and especially potassium, are also active in forming catalytic materials with the fat. The methoxides of alkaline earth metals such as calcium also have been found to possess some activity in the range of temperatures required for the reaction. My work has also indicated that methoxides, in which the cation is the tetrasubstituted ammonium radical, such as tetramethyl methyl ammonium methoxide and lauryl benzyl dimethyl ammonium methoxide also show activity in the reaction of the present invention.

In addition to the methoxides, the corresponding ethoxides, propoxides, butoxides and alkoxides made from alcoholic compounds in general such as lauryl alcohol, ethylene glycol, mono- and diglycerides of the glyceride mixture, and others may be employed. Moreover, I have discovered that the addition of alkali-metal-organic compounds containing the alkali metal atom directly bound to a carbon atom as in triphenylmethyl sodium or to a nitrogen atom as in potassium pyrrole will result in the promotion of interesterification as conducted by the present process. The addition of a suspension of finely divided metallic potassium hydroxide in a hydrocarbon solvent consisting essentially of undecane has also resulted in the promotion of the interesterification reaction at low temperature.

Because of the great variety of materials that may be used to form the active catalyst and because the actual structure of the catalytic materials formed is as yet not accurately known, the catalytic materials are generically referred to in the claims as low temperature molecular rearrangement catalysts.

Amounts of catalytic material equivalent to 0.5 per cent by weight of sodium methoxide based on the weight of the glyceride mixture may be employed, but there is no particular advantage in employing quantities much in excess of 0.2 per cent, assuming of course that all of the catalyst added is available for promoting the reaction. Even small quantities, such as 0.03 per cent, are effective at low temperature, but I have found that the reaction proceeds at a rather low rate unless at least 0.05 per cent is employed. The preferred range of catalyst usage is the equivalent from about 0.05 per cent to about 0.5 per cent sodium methoxide.

The addition of the catalytic material to the glyceride mixture is preferably conducted in such a way that uniform distribution throughout the glyceride mixture in a finely dispersed phase results. The examples above show the use of a fine dispersion of sodium methoxide in xylene. A solution of sodium methoxide in anhydrous methanol or of sodium ethoxide in ethanol may also be used. It may be especially convenient to store the catalyst in the form of a dispersion in an inert solvent other than xylene, such as toluene, petroleum naphtha and the like, and such dispersions may be dispersed readily in the glyceride mixtures. The dispersion may be prepared by the reaction of sodium and alcoholic substance in stoichiometric amounts in the solvent itself prior to the addition thereof to the glyceride mixture. In the case of catalytic materials that can be prepared in powdered form, such as powdered sodium methoxide, the powdered material may be mixed with the fat without the use of a carrier.

When the highly reactive catalytic materials referred to herein are employed to promote the interesterification reaction in the practice of the process, it is desirable that the glyceride mixture be essentially free from moisture, oxygen, fatty acids, carbon dioxide, peroxides, and the like so as to avoid decomposition of the catalytic material to such an extent as would reduce the content of same to an ineffective amount.

The low temperature interesterification catalysts employed in carrying out my invention are highly efficient in effecting the regrouping of fatty acid radicals, and for this reason it is preferable to render the catalysts inactive, after the desired arrangement has taken place and before the temperature of the fat is allowed to rise appreciably, so that substantially no modification results during handling of the fat. I have noted, for example, that mere heating of the rearranged fat in the presence of the active catalyst to a temperature at which the crystallized portion becomes liquid will permit an undesirable reverse rearrangement in which the saturated triglyceride content decreases in a distribution tending toward the random rearrangement obtained in the ordinary molecular interchange reactions conducted wholly in the liquid phase. Thus in order to retain the degree and kind of rearrangement effected at low temperature, it is preferable to treat the mixture containing the catalyst with an inactivating material, for example, an acid reacting compound such as hydrochloric acid, phosphoric acid, carbonic acid, glacial acetic acid, or water, aqueous solutions, etc., and thereby inactivate the catalyst before any undesirable reversion in molecular rearrangement takes place. If the rearranged fat is fairly fluid or is in the condition of a slurry, treatment with the acid material is a simple procedure. If, however, after rearrangement the fat is solid or substantially so, it may be necessary to reduce it to granular form before treatment with the acid in order to inactivate the catalyst effectively.

Separation of the liquid fraction of the rearranged oil may be accomplished immediately after the rearrangement reaction has been completed, in which case the separation is preferably conducted at the same temperature as the final temperature of rearrangement. However, it may be impractical in the case of some oils to obtain a crystalline structure even with gradual cooling or "seeding" which is conducive to efficient separation of solid and liquid fractions in filtration processes, and in these cases I find that it may be advisable to render the catalyst inactive by treatment with an acid, then melt the mixture of solid and liquid glycerides, wash, and then subject the thus treated rearranged oil to fractional crystallization involving conditions under which the solid or saturated triglycerides will precipitate. This step may be conducted on the whole oil, or, if more complete separation of solid and liquid glycerides is desired, it may be conducted on a solution of the oil in a low boiling, inert solvent for the oil such as petroleum ether.

Separation of the liquid and solid fractions may also be conducted by a two-phase liquid separation with the aid of a partially miscible solvent such as furfural.

Having thus described my invention, what I claim and desire to secure by Letters Patent is:

1. The process of treating a triglyceride constituted of combined fatty acids whose molecular structures differ in respects affecting solubility of glycerides thereof in the glyceride system, the said combined fatty acids consisting predominantly of unsaturated fatty acids, which comprises contacting said triglyceride with a low temperature molecular rearrangement catalyst at a temperature, below 110° F., at which a substantial portion of the triglyceride is liquid, to cause rearrangement of the radicals in the triglyceride molecules, the temperature being sufficiently low to permit crystallization of solid triglycerides of low solubility as same are formed, maintaining said temperature within such limits while progressive crystallization of solid triglycerides takes place, and fractionating the rearranged triglycerides under conditions which inhibit reversal of the rearrangement.

2. The process of treating a triglyceride constituted of combined saturated and unsaturated fatty acids of which the combined unsaturated fatty acids are in predominant proportion, which comprises contacting said triglyceride with a low temperature molecular rearrangement catalyst at a temperature, below 110° F., at which a substantial portion of the triglyceride is liquid, to cause rearrangement of the fatty acid radicals in the triglyceride molecules, the temperature being sufficiently low to permit crystallization of solid triglycerides of low solubility consisting predominantly of completely saturated triglycerides as same are formed, maintaining said temperature within such limits while progressive crystallization of solid triglycerides takes place, and fractionating the rearranged triglycerides under conditions which inhibit reversal of the rearrangement.

3. The process of treating marine animal oils and obtaining therefrom fractions suitable for use in the soap and drying oil industries respectively, comprising intimately contacting said oil with a low temperature molecular rearrangement catalyst at a temperature below 100° F. and within a range of temperature of which the lower limit is the lowest temperature at which a portion of the oil is liquid, and the upper limit is the highest temperature at which saturated triglycerides can crystallize in the liquid portion of the oil as the same are formed by rearrangement, maintaining the temperature within said range while progressive crystallization of saturated triglycerides formed in rearrangement takes place, and separating the rearranged oil into a fraction suitable for use in the soap industry and a fraction suitable for use in the drying oil industries, the said separation being conducted under conditions which inhibit reversal of the rearrangement.

4. The process of claim 3 in which the marine animal oil has an iodine number not substantially less than 130.

5. The process of preparing from marine animal oils an improved oil suitable for use in the drying oil industries, comprising intimately contacting a marine animal oil having an iodine number not substantially less than 130, with a low temperature molecular rearrangement catalyst at a temperature below 100° F., and within a range of temperature of which the lower limit is the lowest temperature at which a portion of the oil is liquid, and the upper limit is the highest temperature at which saturated triglycerides can crystallize in the liquid portion of the oil as the same are formed by rearrangement, maintaining the temperature within said range while progressive crystallization of saturated triglycerides formed in rearrangement takes place, and until the combined saturated fatty acid content of the liquid glycerides has been reduced to not substantially higher than 15 per cent, and separating from the rearranged oil a liquid fraction having drying oil characteristics and containing not substantially more than 15 percent combined saturated fatty acid.

6. The process of claim 5 in which the final temperature of rearrangement is not substantially higher than 60° F. and in which the liquid fraction separated contains less than 10 per cent combined saturated fatty acids.

7. The process of treating a marine animal oil having an iodine number not substantially less than 130, which comprises intimately contacting said oil with a low temperature molecular rearrangement catalyst at a temperture below 100° F. and within a range of temperature of which the lower limit is the lowest temperature at which a portion of the oil is liquid, and the upper limit is the highest temperature at which saturated triglycerides can crystallize in the liquid portion of the oil as the same are formed by rearrangement, maintaining the temperature within said range while progressive crystallization of saturated triglycerides formed in rearrangement takes place, inactivating the catalyst without substantial change in temperature, melting the rearranged oil, subjecting the melted rearranged oil to fractional crystallization, and separating solid and liquid glyceride fractions, thereby recovering a liquid fraction having drying oil characteristics.

8. The process of treating a marine animal oil having an iodine number not substantially less than 130, which comprises intimately contacting said oil with a low temperature molecular rearrangement catalyst at a temperature below 100° F. and within a range of temperature of which the lower limit is the lowest temperature at which a portion of the oil is liquid, and the upper limit is the highest temperature at which saturated triglycerides can crystallize in the liquid portion of the oil as the same are formed by rearrangement, maintaining the temperature within said range while progressive crystallization of saturated triglycerides formed in rearrangement takes place, inactivating the catalyst without substantial change in temperature, melting the rearranged oil, and subjecting the melted oil to liquid-liquid extraction with a partially miscible solvent, thereby separating from the rearranged oil a fraction having drying oil characteristics.

9. The process of treating a marine animal oil having an iodine number not substantially less than 130, which comprises intimately contacting said oil with a low temperature molecular rearrangement catalyst at a temperature below 100° F. and within a range of temperature of which the lower limit is the lowest temperature at which a portion of the oil is liquid, and the upper limit is the highest temperature at which saturated triglycerides can crystallize in the liquid portion of the oil as the same are formed by rearrangement, maintaining the temperature within said range while progressive crystallization of saturated triglycerides formed in rearrangement takes place, inactivating the catalyst without substantial change in temperature, dissolving the rearranged oil in an inert solvent, subjecting the solution to fractional crystallization, separating precipitated solid glycerides from the solution of liquid oil in solvent, removing the solvent from the liquid oil and thereby recovering an oil having drying oil characteristics.

10. The process of preparing an improved bodied oil from marine animal oils, comprising intimately contacting a marine animal oil having an iodine number not substantially less than 130 with a low temperature molecular rearrangement catalyst at a temperature below 100° F. and within a range of temperature of which the lower limit is the lowest temperature at which a portion of the oil is liquid, and the upper limit is the highest temperature at which saturated triglycerides can crystallize in the liquid portion of the oil as the same are formed by rearrangement, maintaining the temperature within said range while progressive crystallization of saturated triglycerides formed in rearrangement takes place, separating from the rearranged oil liquid glycerides having drying oil characteristics and bodying the liquid glycerides.

11. The process of claim 10 in which the bodying procedure comprises polymerizing the liquid glycerides by heat treatment, thereby producing a bodied oil which is free of "polymer clouds" at ordinary room temperature.

12. The process of claim 2 in which the glyceride oil is seeded with substantially completely saturated triglycerides.

13. The process of treating marine animal oils and of obtaining therefrom an unsaturated fraction suitable for use in the drying oil industries, which comprises intimately contacting a marine animal oil having an iodine number not substantially less than 130 with an alkoxide molecular rearrangement catalyst at a temperature below 100° F. and within a range of temperature of which the lower limit is the lowest temperature at which a portion of the oil is liquid and the upper limit is the highest temperature at which saturated triglycerides can crystallize in the liquid portion of the oil as the same are formed by rearrangement, maintaining the temperature within said range while progressive crystallization of saturated triglyceride formed in rearrangement takes place, and separating from the rearranged oil a liquid glyceride fraction having drying oil characteristics.

14. The process of claim 13 in which the mixture of oil and alkoxide catalyst is subjected to moderate agitation sufficient to maintain precipitated solid glycerides in suspension during rearrangement.

15. The process of treating a triglyceride constituted of combined saturated and unsaturated fatty acids of which the combined unsaturated fatty acids are in predominant proportion, which comprises contacting said triglyceride with a low temperature molecular rearrangement catalyst at a temperature, below 110° F., at which the triglyceride is liquid to cause rearrangement of the fatty acid radicals in the triglyceride molecules, slowly cooling the reaction mixture to a temperature just below that temperature at which precipitation of substantially completely saturated triglycerides takes place, thereafter further reducing the temperature slowly and precipitating substantially completely saturated triglycerides formed in the rearrangement reaction, and fractionating the rearranged triglycerides under conditions which inhibit reversal of the rearrangement.

16. The process of treating a triglyceride constituted of combined saturated and unsaturated fatty acids of which the combined unsaturated fatty acids are in predominant proportion, which comprises contacting said triglyceride with a low temperature molecular rearrangement catalyst at a temperature, below 110° F., at which the triglyceride is liquid to cause rearrangement of the fatty acid radicals in the triglyceride molecules, slowly cooling the reaction mixture to a temperature just below that temperature at which precipitation of substantially completely saturated triglycerides takes place, thereafter further reducing the temperature slowly and precipitating combined saturated fatty acids as substantially completely saturated triglycerides, continuing the simultaneous rearrangement and precipitation until substantially all of the combined saturated fatty acids have been precipitated in the form of substantially completely saturated triglycerides, and separating same from the liquid triglycerides under conditions which inhibit reversal of the rearrangement.

EDDY W. ECKEY.

REFERENCES CITED

The following references are of record in the file of this patent:

UNITED STATES PATENTS

| Number | Name | Date |
|---|---|---|
| 1,873,513 | Van Loon | Aug. 23, 1932 |
| 2,205,381 | Eckey | June 25, 1940 |
| 2,290,609 | Goss | July 21, 1942 |
| 2,340,104 | Brown | Jan. 5, 1944 |

FOREIGN PATENTS

| Number | Country | Date |
|---|---|---|
| 249,916 | Great Britain | 1926 |